United States Patent
Inoue et al.

(10) Patent No.: US 8,648,703 B2
(45) Date of Patent: Feb. 11, 2014

(54) TIRE PRESSURE MONITORING APPARATUS AND METHODS

(75) Inventors: Eiji Inoue, Yokohama (JP); Masanori Usui, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1079 days.

(21) Appl. No.: 12/339,853

(22) Filed: Dec. 19, 2008

(65) Prior Publication Data

US 2009/0167517 A1 Jul. 2, 2009

(30) Foreign Application Priority Data

Dec. 26, 2007 (JP) .................................. 2007-334034

(51) Int. Cl.
*B60C 23/00* (2006.01)
(52) U.S. Cl.
USPC ........... 340/442; 340/444; 340/445; 340/447; 73/146.3; 701/36
(58) Field of Classification Search
USPC ......... 340/442, 444, 445, 447, 448; 73/146.3, 73/146.5, 146.8; 701/36; 375/259; 280/789
See application file for complete search history.

(56) References Cited

U.S. PATENT DOCUMENTS

| | | | | |
|---|---|---|---|---|
| 4,839,835 A | * | 6/1989 | Hagenbuch | .................. 702/174 |
| 6,089,907 A | * | 7/2000 | Shoblom | ....................... 439/528 |
| 6,304,610 B1 | * | 10/2001 | Monson | ......................... 375/259 |
| 6,965,305 B2 | * | 11/2005 | Taguchi et al. | ............... 340/447 |
| 2003/0227168 A1 | * | 12/2003 | Buuck et al. | .................. 280/851 |
| 2004/0023026 A1 | * | 2/2004 | Rambaud et al. | ............. 428/343 |
| 2005/0087593 A1 | * | 4/2005 | Benedict | ....................... 235/375 |
| 2005/0161274 A1 | * | 7/2005 | Tsuruta | .......................... 180/282 |
| 2005/0242938 A1 | | 11/2005 | Brown et al. | |
| 2005/0258950 A1 | * | 11/2005 | Sahashi et al. | ................ 340/444 |
| 2006/0061462 A1 | * | 3/2006 | Shimura | ........................ 340/445 |
| 2007/0073494 A1 | * | 3/2007 | Isono et al. | ...................... 702/41 |
| 2007/0182150 A1 | * | 8/2007 | Simpson | ........................ 280/789 |

FOREIGN PATENT DOCUMENTS

| | | |
|---|---|---|
| JP | 3114945 A | 5/1991 |
| JP | 2005253074 | 9/2005 |
| JP | 2006021660 A | 1/2006 |

OTHER PUBLICATIONS

English Patent Abstract of JP2005253074 from esp@cenet.com, published Sep. 15, 2005 (1 page).
Office Action in Japanese Patent Application No. 2007-334034, dated Mar. 2, 2010 and English translation thereof (5 pages).
English Patent Abstract of JP2006021660 from esp@cenet.com, published Jan. 26, 2006 (1 page).
English Patent Abstract of JP3114945 from esp@cenet.com, published May 16, 1991 (1 page).

* cited by examiner

*Primary Examiner* — Daryl Pope
(74) *Attorney, Agent, or Firm* — Osha Liang LLP

(57) ABSTRACT

A vehicle having a sensor apparatus includes a first mounting portion and a second mounting portion disposed on a side surface of a vehicle frame, wherein the first and second mounting portions are spaced apart in a vehicle length direction, wherein the first and second mounting portions configured to receive a load platform of the vehicle, a wheel assembly comprising a sensor transmitter, and a receiver mounted to the side surface between the first and the second mounting portions, the receiver configured to receive a signal from the sensor transmitter.

19 Claims, 8 Drawing Sheets

TIRE PRESSURE MONITORING APPARATUS AND METHODS

CROSS-REFERENCE TO RELATED APPLICATIONS

The present application claims priority from Japanese Patent Application No. 2007-334034, filed Dec. 26, 2007. The contents of the priority application are hereby incorporated by reference in their entirety.

BACKGROUND OF THE DISCLOSURE

1. Field of the Disclosure

The present disclosure relates to an air pressure monitoring system for monitoring an air pressure in a tire.

2. Description of the Related Art

Generally, in a tire pressure monitoring system, which may be called a TPMS (Tire Pressure Monitoring System), a pressure sensor for detecting a tire pressure, a transmitter for transmitting a detection signal of the pressure sensor to a vehicle side and a battery for supplying electric power to the pressure sensor and the transmitter are accommodated in a case attached to a wheel. The detection signal from the pressure sensor is received by a receiver attached to the vehicle for performing an indication or the like, thereby monitoring individual tire pressures (for example, described in Unexamined Japanese Patent Publication No. 2005-253074).

SUMMARY OF THE CLAIMED SUBJECT MATTER

In one aspect, embodiments of the present disclosure relate to a vehicle having a sensor apparatus including a first mounting portion and a second mounting portion disposed on a side surface of a vehicle frame, the first and second mounting portions spaced apart in a vehicle length direction, the first and second mounting portions configured to receive a load platform of the vehicle, a wheel assembly comprising a sensor transmitter, and a receiver mounted to the side surface between the first and the second mounting portions, the receiver configured to receive a signal from the sensor transmitter.

In another aspect, embodiments of the present disclosure relate to a method to transmit a signal from a wheel assembly to a receiver of a vehicle including mounting the receiver between a pair of mounting portions disposed upon a side surface of a vehicle frame, supporting a load platform of the vehicle with the pair of mounting portions, and transmitting the signal from a sensor transmitter of a wheel assembly to the receiver.

In another aspect, embodiments of the present disclosure relate to a vehicle having a sensor apparatus including first and second means for mounting a load platform disposed on a side surface of a vehicle frame, the first and second means for mounting spaced apart in a vehicle length direction, a wheel assembly comprising a means for transmitting a signal, and a means for receiving the signal mounted to the side surface between the first and second means for mounting.

BRIEF DESCRIPTION OF DRAWINGS

Features of the present disclosure will become more apparent from the following description in conjunction with the accompanying drawings.

DETAILED DESCRIPTION

Hereinafter, a specific embodiment of the present disclosure will be described in detail with reference to drawings.

An air pressure monitoring system of this embodiment monitors a tire pressure, thereby contributing to safer driving. In vehicles such as automobiles, the tire pressure may be lowered naturally or due to an external cause (for example, a nail getting stuck in a tire). In case the air of a tire is deflated completely and a user may easily be aware of the air pressure being low before driving or immediately after start of driving, it can be dealt with by replenishment of air, replacement of tire or the like. However, in case slow leakage (which means that tire air is leaking little by little) occurs, it may be difficult for the user to notice that the tire pressure has been lowered and continues driving on the deflated tire. If the driving is continued under the condition of the tire pressure being lower than a predetermined value, it not only deteriorates the fuel consumption but might cause breakage of the tire or the like. For this reason, a system for monitoring tire pressure may be installed on a vehicle.

In this kind of tire pressure monitoring system, the receiver has heretofore been disposed inside a resinous fender protector (e.g., inside a wheel arch), thereby enabling a detection signal (i.e., radio waves) to pass through the fender protector and be received by a receiver and at the same time enabling the receiver to be protected from chipping (e.g., stones thrown off) and splashes (e.g., splashes of water and mud) from tires by the fender protector. However, for example, in a vehicle having a load-carrying platform at a vehicle rear portion, such as a pick-up truck, the vehicle portion around a rear wheel assembly may be configured without a fender protector provided to an inner circumferential periphery of a fender. Thus there may not be any place for installation of a receiver for receiving a pressure detection signal concerning a tire pressure. Thus, with the air pressure monitoring system of this embodiment, the vehicle can monitor tire pressure even without such a fender protector.

Such an air pressure monitoring system includes a pressure sensor 1 attached to a vehicle wheel assembly for detecting a tire pressure and transmitting a pressure detection signal and a receiver 2 for receiving the pressure detection signal transmitted from the pressure sensor 1, and is configured to relay the tire pressure signal detected by the receiver 2 to the driver by indicating the signal by an instrument provided on an instrument panel.

The pressure sensor 1 may include a pressure sensor that detects the air pressure in a tire 3, a transmitter that transmits a pressure detection signal concerning the tire pressure detected by the pressure sensor and, a battery that supplies electric power to the pressure sensor and the transmitter, to be accommodated within a casing installed on a wheel 4. Such pressure sensors 1 may be attached to respective wheels 4 to detect the air pressures of tires 3 of all the front and rear vehicle wheel assemblies. In the meantime, because in a vehicle that carries a load on a load-carrying platform such as a pick-up truck, set air pressures of tires 3 may be different between the front and rear wheel assemblies, it is general practice to attach pressure sensors/transmitters 1 to wheels 4 of all vehicle wheel assemblies.

To outside surfaces 6a of a pair of frame rails 6 may be disposed on both sides opposed in the vehicle width direction so as to extend in the vehicle longitudinal direction (in the direction of the arrow A in FIG. 2) may be attached a plurality of mount portions 7 for attaching the load-carrying platform 5 to frame rails 6 in a way to be spaced apart and positioned one behind another along the vehicle longitudinal direction and protrude from the outside surfaces 6a of the frame rails 6 outward in the vehicle width direction (in the direction of the arrow B). The receiver 2 may be disposed between two of the plurality of mount portions 7.

Figure 1:
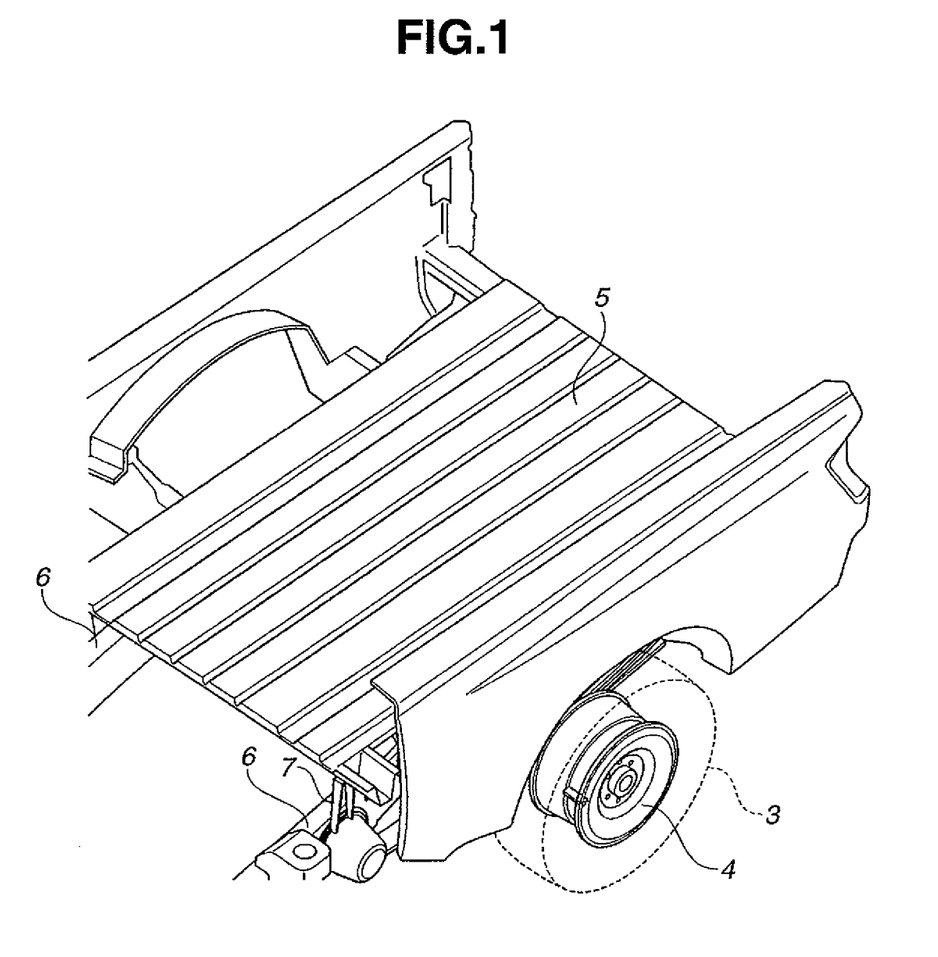
FIG. 1 is a perspective view showing a rear portion of a vehicle, on which an air pressure monitoring system of an embodiment is installed.
Figure 2:
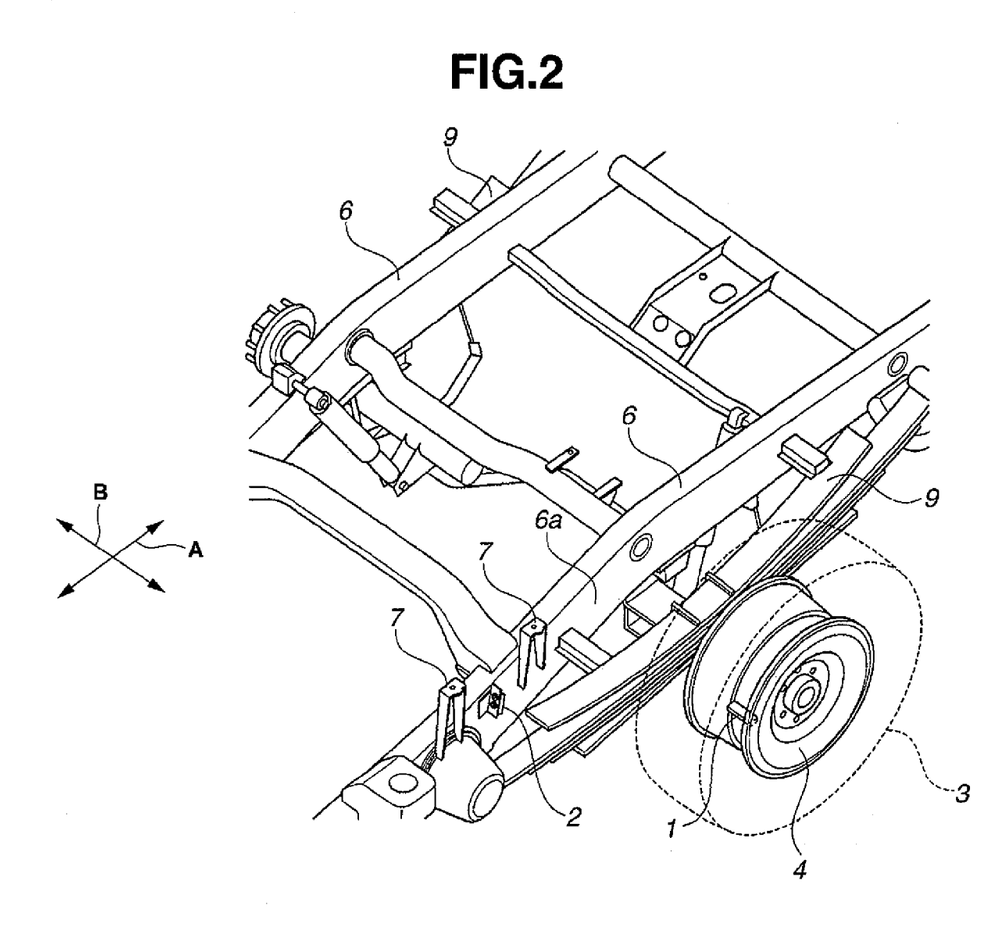
FIG. 2 is a perspective view of rear portions of a frame of the vehicle, from which a load-carrying platform is removed.

In FIG. 2, a receiver 2 that receives pressure detection signal of a detected tire pressure of the tire 3 may be provided forward of the rear tire 3 (i.e., forward of the rear wheel assembly) that is suspended by a rear suspension system and between two adjacent mounting portions 7 that are arranged so as to be spaced from each other in the vehicle longitudinal direction. Though not shown for brevity, between mounting portions 7 that are installed on the outside surface 6a of the other frame rail 6 may be provided another receiver 2 that receives detection signal of a tire pressure of a rear tire that is suspended on that frame rail 6 by the rear suspension system.

The receiver 2 may be disposed adjacent the vehicle wheel assembly that the pressure for which is to be detected, in order to receive pressure detection signal concerning tire pressures from the respective vehicle wheel assembly and distinguished from the other pressure detection signals from the other wheel assemblies. Further, the receiver 2 may be installed on a bracket 8 on the outside surface 6a of the frame rail 6 that is less influenced by vehicle vibrations and may has a higher rigidity. Further, the receiver 2 may be installed in a way to direct the substrate normal of an inner circuit board so that an antenna pattern of the inner circuit board faces a side wall surface 3a of the tire 3. Further, the receiver 2 may be installed so that a connector is oriented downward, thereby preventing ingress of water at times when dew condensation may form proximate to a wiring harness at the connector.

Figure 3:
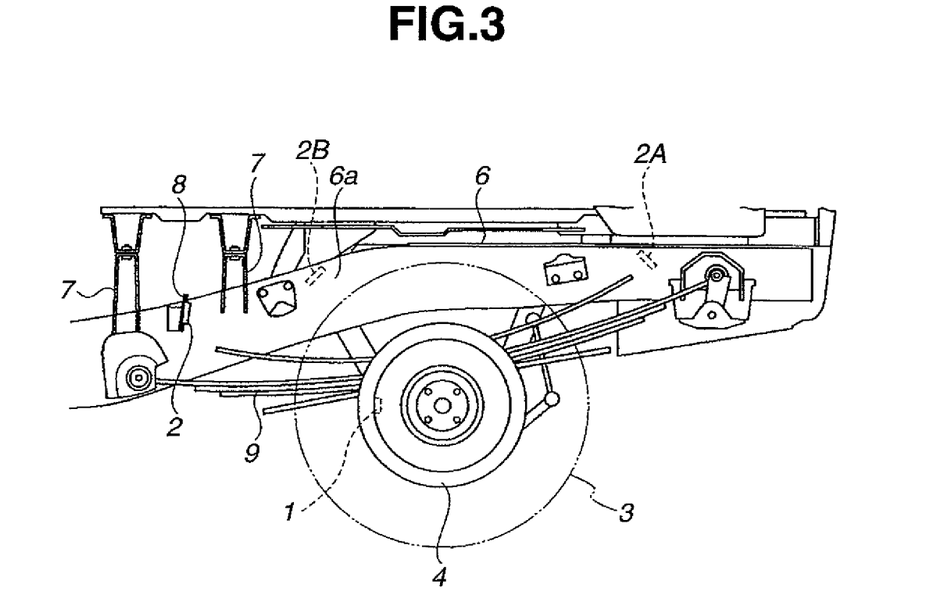
FIG. 3 is a rear wheel assembly and its adjacent portion of the vehicle of FIG. 1.
Figure 4:
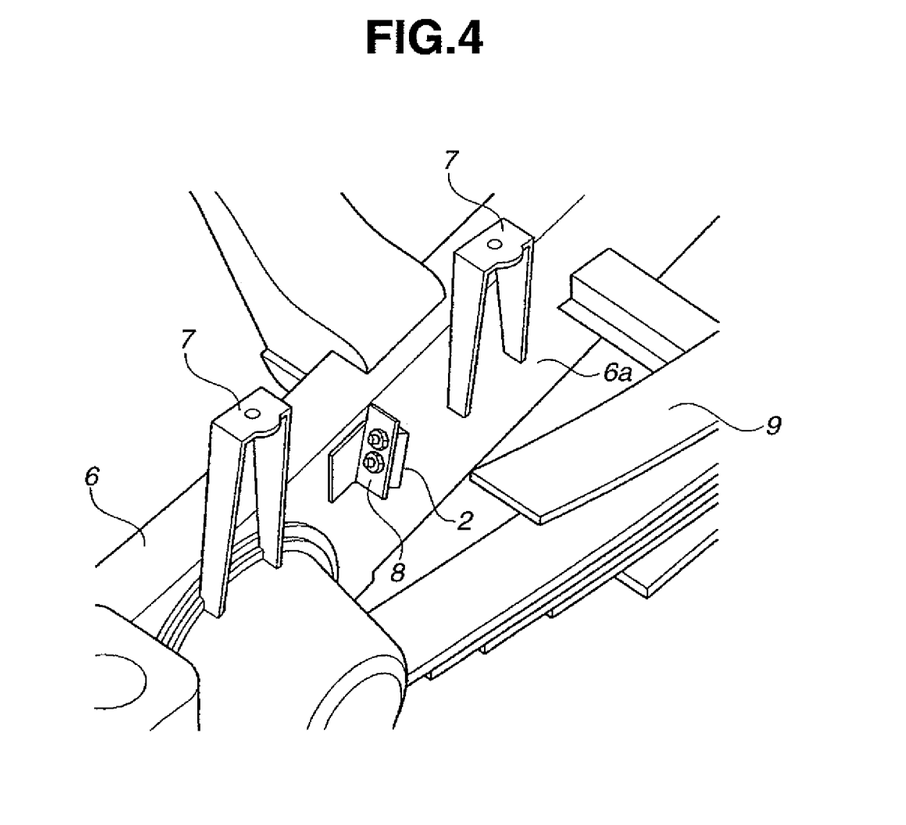
FIG. 4 is a perspective view of a portion of the vehicle to which a receiver is attached
Figure 5:
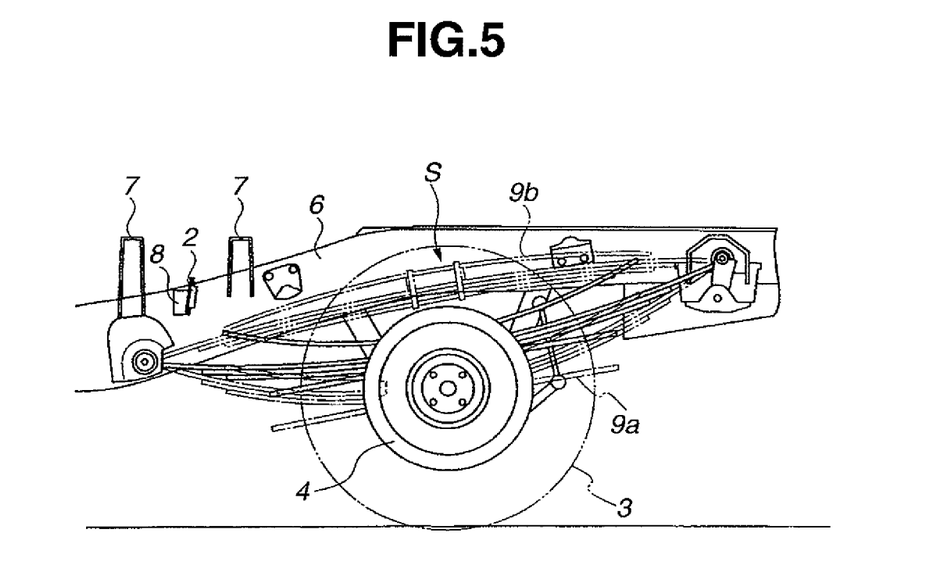
FIG. 5 is a view showing arrangement of the receiver at a position outside a vertical displacement range of a leaf spring of a rear suspension system.

Further, the receiver 2 may be located above a leaf spring 9 of the rear suspension system when viewed in side elevation and sideways of the leaf spring 9 when viewed in plan view (e.g., FIG. 3). In operation, leaf spring 9 may be displaced vertically, having a movable range S (in the area between a lower limit position 9a shown by one-dot chain lines and an upper limit position 9b shown by two-dot chain lines in FIG. 5). The receiver may be disposed so as to attain a predetermined clearance from the movable range S of the leaf spring 9. Namely, the above-described receiver 2 may be attached to the outside surface 6a of the frame rail 6 at a position where it does not contact the leaf spring 9 when the suspension system is operated.

Figure 6:
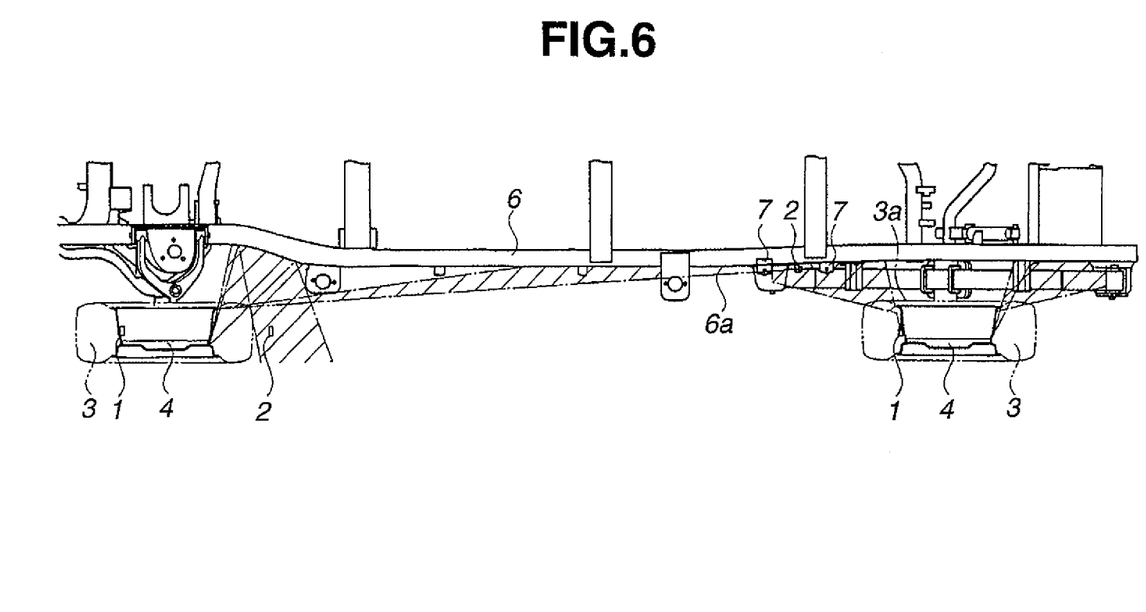
FIG. 6 is a plan view of a detection signal receiving area by the receiver.
Figure 7:
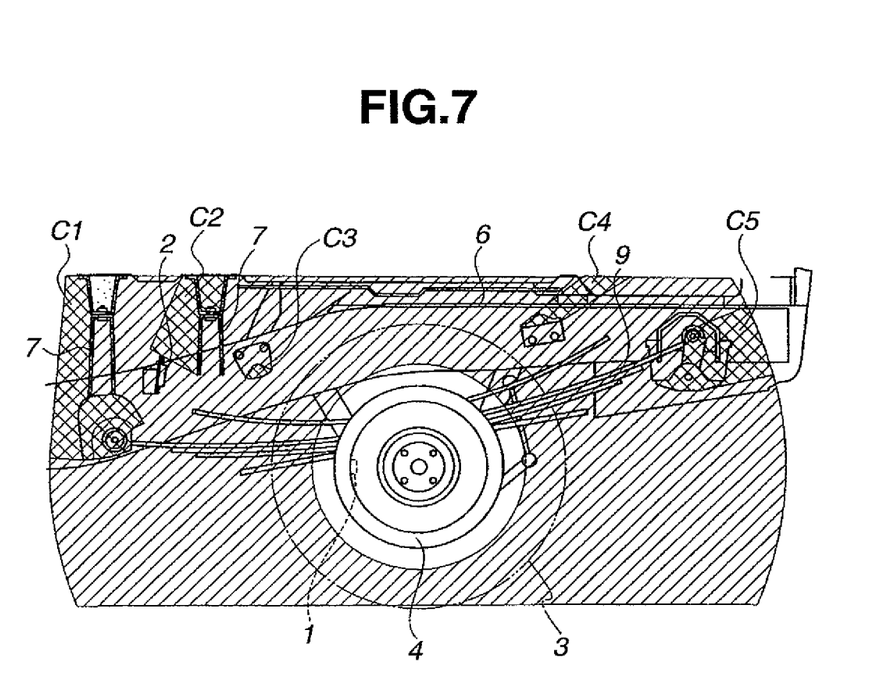
FIG. 7 is a side elevational view of a detection signal receiving area by the receiver.

Further, because the radio signal transmitted from the pressure sensor 1 may not pass (generally) through metals, the receiver 2 may be disposed within a receivable range in which the pressure detection signal can be communicated to the receiver without passing through a metal portion. The area inside the receivable range is shown in FIGS. 6 and 7 by hatching. The area outside the receivable range is shown in FIG. 7 by cross-hatched areas C1 to C5. Additionally, receiver 2 may be positioned adjacent to rail 6 such that signals from other wheels 3 do not interfere or are otherwise unable to communicate with receiver 2. Thus, each receiver 2 may be positioned (e.g., behind metal rails 6, etc.) such that receivers 2 only communicate with the pressure sensor 1 closest thereto.

While the receiver 2 for the rear wheel assembly may be disposed forward of the rear wheel assembly, the receiver 2 for the front wheel assembly may be disposed within the front side fender protector (refer to FIG. 6).

Figure 8:
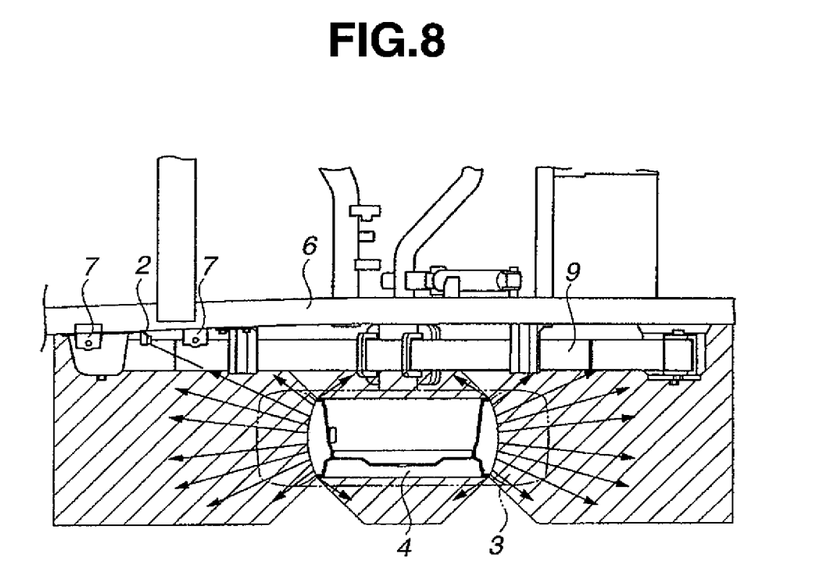
FIG. 8 is a view showing a splash area and an area in which protection against splash is provided by a leaf spring.

Further, the receiver 2 may be disposed at a position where it is protected from impacts (i.e. stones or the like from tire) and splashes (i.e., splashing up of water, mud, or the like by tire). Potential impact and splash areas are shown in FIG. 8 by hatching.

In the embodiment of the air pressure monitoring system structured as above, the receiver 2 may be provided between the mount portions 7 protruding in the vehicle width direction B (outward in the vehicle width direction) from the outside surface 6a of the frame rail 6 such that the receiver may be protected even in a vehicle that does not have a fender protector so that a pressure detection signal may be adequately received by the receiver 2 satisfactorily. Further, because the mount portions 7 may be disposed spaced apart and one behind another along the vehicle longitudinal direction with the receiver 2 therebetween, mount portions 7 may serve as barriers to protect the receiver 2 from impacts and splashes from the front and rear of the vehicle.

Further, by the air pressure monitoring system of this embodiment, should the receiver fail to directly receive the pressure detection signal from the pressure sensor 1, the pressure detection signal may be received by being reflected by the mount portions 7 to be received by the receiver 2 therebetween.

Further, by the air pressure monitoring system of this embodiment, the receiver 2 that receives the pressure detection signal may be disposed between the mount portions 7 so that the pressure detection signal transmitted from a pressure sensor 1 of a front wheel assembly is blocked by the mount portions 7.

Further, by the air pressure monitoring system of this embodiment, the receiver 2 may be spaced apart vertically and horizontally from the leaf spring 9 so that the leaf spring 9 may serve as a barrier wall and protects the receiver 2 from impacts and splashes Further, by the air pressure monitoring system of this embodiment, the receiver 2 may be disposed proximate to rear wheel assembly and forward of the rear wheel assembly such that the length of the wire harness connecting the instrument panel and the receiver 2 may be minimized. For example, in case, as shown in FIG. 3, a receiver 2A may be provided rearward of a rear wheel assembly, it is provided at a place far from the front wheel assembly and can be effectively prevented from impacts and splashes from the front wheel assembly but the length of the harness may need to be extended, resulting in increased cost and weight. Further, in case, as shown in FIG. 3, a receiver 2B may be provided forward of a rear wheel assembly and adjacent that rear wheel assembly, which is in an area where there is not any obstacle blocking the pressure detection signal from the front wheel assembly, and therefore receiver 2B may receive a pressure detection signal transmitted from the pressure sensor 1 for detecting the pressure of the tire 3 of a front wheel assembly which creates a possibility that the tire pressure of the front wheel assembly is indicated as the tire pressure of the rear wheel assembly.

Further, by the air pressure monitoring system of this embodiment, the pressure sensors 1 may be provided to all vehicle wheel assemblies, respectively, such that the air pressures of all four tires 3 may be accurately and simultaneously known.

Formerly, the receiver may have been disposed inside a resinous fender protector (wheel arch), thereby enabling a detection signal (radio waves) to pass through the fender protector and be received by the receiver and at the same time protecting the receiver from impacts and splashes from tires by the fender protector. However, the receiver may have been unable to be installed in this manner on a vehicle when the vehicle is not equipped with the fender protector.

Advantageously, embodiments disclosed herein provide an air pressure monitoring system that enables arrangement of a receiver even in a vehicle that is not equipped with a fender protector at an inner periphery of a fender and that enables the receiver to receive detection signal satisfactorily.

Embodiments disclosed herein include a receiver that receives a pressure detection signal transmitted from the pressure sensor means attached to a vehicle wheel assembly and detecting a tire pressure. The vehicle may include a frame extending in the vehicle longitudinal direction along a lateral side portion of a vehicle, and having an outboard facing surface and a first mounting portion and a second mounting portion configured to receive a load platform and disposed on and protruding outboard from the outboard facing surface. The first mounting portion may be disposed spaced apart from and may be positioned forward of the second mounting portion. The receiver may be disposed between the first mounting portion and second mounting portion.

In embodiments disclosed herein, the receiver may be disposed between the first mounting portion and the second mounting portion that protrude outward in the vehicle width direction from the outboard facing surface of the frame such that the first mounting portion and the second mounting portion located at the front and rear of the receiver serve as barriers and the receiver may be protected from chipping and splashes from the front and rear of the vehicle.

Further, according to certain embodiments disclosed herein, pressure signals from the pressure sensor attached to the vehicle wheel assembly, which has been unable to be received directly, may be received through reflection on the mount portions that may be provided one behind another along the vehicle longitudinal direction with the receiver therebetween.

Further, according to certain embodiments disclosed herein, a signal from the detection transmitting means provided to the front wheel assembly is obstructed by the mount portion disposed forward of the receiver and is prevented from being received by the receiver on the rear wheel assembly side. By this, the receiver may not receive an erroneous signal and accurate detection of a tire pressure of a vehicle wheel assembly may be enabled.

Additionally, while embodiments disclosed herein relate to sensors and receivers to send and receive tire pressure data from wheels, embodiments disclosed herein shall not be limited in scope to pressure sensors. As would be understood by those having ordinary skill in the art, sensors and receivers configured to measure and transmit any information from a wheel assembly to a vehicle electronic system may be used in accordance with embodiments disclosed herein without departing from the claimed subject matter. In particular, acceleration sensors, angular velocity sensors, pressure sensors, temperature sensors, vibration sensors, gas sensors, and the like may all be used to transmit data from a wheel assembly to vehicle (body) mounted receivers in accordance with embodiments disclosed herein.

Furthermore, while a tire pressure sensor would (normally) measure a condition existing inside a tire of a wheel assembly, nothing contained in this disclosure shall be construed to limit the sensors to sensing conditions inside (or outside) the boundary of a vehicle tire. For example, velocity sensors and vibration sensors may be positioned on the outer periphery (or other locations) of a vehicle wheel and may communicate in the same manner as internal pressure sensors disclosed herein.

While the disclosure has been presented with respect to a limited number of embodiments, those skilled in the art, having benefit of this disclosure, will appreciate that other embodiments may be devised which do not depart from the scope of the present disclosure. Accordingly, the scope of the disclosure should be limited only by the attached claims.

The invention claimed is:

1. A vehicle having a sensor apparatus, comprising:
    a first mounting portion and a second mounting portion disposed on a side surface of a vehicle frame, the first and second mounting portions spaced apart in a vehicle length direction;
    the first and second mounting portions configured to receive a load platform of the vehicle;
    a wheel assembly comprising a sensor transmitter; and
    a receiver mounted to the side surface between the first and the second mounting portions, the receiver configured to receive a signal from the sensor transmitter.

2. The vehicle of claim 1, wherein the wheel assembly comprises a pressure sensor.

3. The vehicle of claim 1, wherein the wheel assembly comprises a sensor selected from the group consisting of temperature sensors, velocity sensors, vibration sensors, and acceleration sensors.

4. The vehicle of claim 1, wherein the sensor transmitter is located within a tire cavity of the wheel assembly.

5. The vehicle of claim 1, wherein the signal comprises a pressure measurement of the wheel assembly.

6. The vehicle of claim 1, wherein the side surface is an outboard facing surface of the vehicle frame.

7. The vehicle of claim 1, wherein:
    the wheel assembly comprises a rear wheel assembly; and
    the receiver is disposed forward of the rear wheel assembly.

8. The vehicle of claim 1, further comprising:
    a suspension system including a leaf spring attached to the side surface,
    wherein the receiver is disposed above and laterally apart from the leaf spring.

9. The vehicle of claim 8, wherein the receiver is disposed above a maximum vertical displacement limit of the leaf spring.

10. The vehicle of claim 1, further comprising a plurality of wheel assemblies.

11. The vehicle of claim 1, wherein the receiver is disposed adjacent to the wheel assembly.

12. The vehicle of claim 1, wherein the receiver is arranged so that a signal transmission path between the wheel assembly and the receiver is unobstructed.

13. The vehicle of claim 1, wherein the first and second mounting portions are arranged to shield the receiver from at least one of impacts and splashes.

14. The vehicle of claim 1 further comprising:
an attachment bracket coupled to the side surface of the vehicle frame,
wherein the receiver is coupled to the attachment bracket.

15. A method to transmit a signal from a wheel assembly to a receiver of a vehicle, the method comprising:
mounting the receiver between a pair of mounting portions disposed upon a side surface of a vehicle frame;
supporting a load platform of the vehicle with the pair of mounting portions; and
transmitting the signal from a sensor transmitter of a wheel assembly to the receiver.

16. The method of claim 15, wherein the signal comprises a pressure measurement of the wheel assembly.

17. The method of claim 15, further comprising shielding the receiver from at least one of impacts and splashes with the mounting portions.

18. A vehicle having a sensor apparatus, comprising:
first and second means for mounting a load platform disposed on a side surface of a vehicle frame, the first and second means for mounting spaced apart in a vehicle length direction;
a wheel assembly comprising a means for transmitting a signal; and
a means for receiving the signal mounted to the side surface between the first and second means for mounting.

19. The vehicle of claim 18, further comprising an attachment means for coupling the means for receiving the signal to the side surface of the vehicle frame.

\* \* \* \* \*